United States Patent Office 3,726,824
Patented Apr. 10, 1973

3,726,824
PREPARATION OF FILM-FORMING LATEXES OF POLYVINYLAROMATIC-POLYDIENE BLOCK COPOLYMERS
Frank L. Saunders, Midland, and Ronald R. Pelletier, Bay City, Mich., assignors to The Dow Chemical Company, Midland, Mich.
No Drawing. Filed Sept. 16, 1970, Ser. No. 72,887
Int. Cl. C08d 7/00
U.S. Cl. 260—29.7 EM    8 Claims

ABSTRACT OF THE DISCLOSURE

Latexes of polyvinylaromatic-polydiene block copolymers are provided by (1) dissolving the block copolymer in an organic liquid which is a selective solvent for the polydiene block, (2) emulsifying the resulting solution in an aqueous medium containing surfactant and (3) stripping the emulsion of organic and excess aqueous liquids to form a stable, concentrated latex.

BACKGROUND OF THE INVENTION

This invention relates to latexes of block copolymers having non-elastomeric and elastomeric block portions and to a method for preparation of film-forming latexes therefrom.

The preparation of films from polymers, particularly elastomeric polymers, may be effected by either extrusion or molding operation on the one hand or by applying a layer of the polymer in latex form to a substrate and subsequently removing aqueous liquid. While the choice of method depends on numerous factors, the process of forming films deposited from latexes is the most attractive for certain applications involving thin-walled articles of complex shape, or the application of the layers to porous substrates, or the application of thin layers of polymers highly diluted with fillers and/or functional materials.

Recently, block copolymers having AB, ABA and BAB configurations wherein A is a non-elastomeric polyvinyl aromatic block and B is an elastomeric polydiene block have been converted to latexes which have many desirable characteristics. See U.S. Pat. Nos. 3,360,599 and 3,238,173.

Unfortunately in order to provide such latexes with film-forming capability at room temperature or at temperatures over a broad range, it is necessary to employ a relatively large proportion of the elastomeric block of polymerized diene monomers. In addition to being more expensive than vinyl aromatic monomers of the non-elastomeric block, the diene monomer lowers the thermal and oxidative resistance of the block copolymers.

Therefore, it would be highly desirable to provide a stable latex of a polyvinylaromatic-polydiene block copolymer having a predominant amount of polyvinylaromatic block which is capable of forming a film at room temperature which film has improved thermal and oxidative resistance.

SUMMARY OF THE INVENTION

In accordance with the present invention a stable, high solids latex of a normally solid, block copolymer having the general configuration of A—B, each A being a polymer block of a monovinylidene carbocyclic aromatic compound and each B being a polymer block of an aliphatic conjugated diene, and a molar ratio of A:B in the range from about 0.8:1 to about 2:1 is provided by (1) dissolving the copolymer in a selective solvent for B, (2) emulsifying the solution in an aqueous medium and (3) stripping the emulsion of organic and excess aqueous liquids. This latex has a unique characteristic in that the diene block forms the continuous phase in the latex particles even though the molar ratio of aromatic block to diene block is 0.8:1 up to about 2:1 or greater. Correspondingly, the aromatic block is the dispersed phase in the latex of this invention.

This unique characteristic of the latex particles is believed to impart improved thermal and oxidative resistance to films prepared from such latexes. As a further advantage, such latexes are film-forming at lower temperatures than those latexes in which the monovinylidene aromatic block is the continuous phase.

The films made in the practice of this invention are suitably employed as protective coatings for a variety of substrates such as wood, metal, plastic, paper, paperboard and the like. In addition to the preparation of films, the latexes of the present invention are also effectively employed as binders or adhesives for a variety of materials, e.g. textile fibers, and as fillers or reinforcing additives in many polymeric compositions.

DESCRIPTION OF THE PREFERRED EMBODIMENTS

The polymers employed in the present invention are generally described as polyvinylaromatic-polydiene block copolymers having an A—B configuration and hereinafter referred to as A—B block copolymers. Preferably the A—B block copolymers have inherent viscosities of from about 0.6 to about 2.5 deciliters/gram (0.6 gram of copolymer per 10 grams of toluene at 25° C.). Such A—B block copolymers comprise from about 50 to about 90 weight percent of A-block, preferably from about 60 to about 80 weight percent, and from about 10 to about 50 weight percent of B-block, preferably from about 20 to about 40 weight percent.

The A-blocks are non-elastomeric polymer blocks of predominantly monovinylidene carbocyclic aromatic monomer or monomers such as styrene, α-methylstyrene, ar-methylstyrene, α,ar-dimethylstyrene, ar-t-butylstyrene, ar-chloro- and ar,ar-dichlorostyrene, ar-bromo- and ar,ar-dibromostyrene, vinyl napthalene and the like. The A-block advantageously has a molecular weight generally in the range of from about 30,000 to about 800,000.

The B-blocks are elastomeric polymer blocks of predominantly aliphatic conjugated diene or dienes such as 1,3-butadiene, isoprene, methylisoprene, and the like. The B-block advantageously has a molecular weight generally in the range of from about 10,000 to about 400,000.

The A—B block copolymers can be made by processes involving the sequential formation of the individual blocks. More specifically, the copolymers are formed, for example, by (1) polymerizing monovinylidene carbocyclic aromatic monomer such as styrene in the presence of a lithium based initiator or a Ziegler type catalyst, (2) introducing aliphatic conjugated diene such as butadiene and permitting polymerization to continue until all of the monomer is consumed.

In the practice of the invention, the A—B block copolymer, singularly or as a blend of the block copolymer and another polymer such as polystyrene and polybutadiene, is first dissolved in a water-immiscible organic liquid which is a selective solvent for the elastomeric B-block.

As defined, selective solvents are good solvents for the B-block, but poor solvents for the A-blocks. Generally, the selective solvent has solubility parameter within ±0.5 of the solubility parameter of the B-block and without ±0.5 of the solubility parameter of the A-block. Exemplary selective solvents are the cyclic alkanes such as cyclopentane, cyclohexane, cycloheptane and the like and mixtures of aromatic hydrocarbons such as benzene, toluene, naphthalene and xylene with acyclic alkanes such as n-pentane, n-hexane, n-heptane, n-octane, iso-octane and the like wherein the proportion of aromatic hydrocarbon to acyclic alkane is governed by the desired solubility parameter.

Solutions of the A—B block copolymer advantageously contain from about 5 to about 30 weight percent of the block copolymer, preferably from about 10 to about 15 weight percent.

The resulting solutions are emulsified in an aqueous emulsifying medium in amounts such that the volume ratio of polymer solution to aqueous emulsifying medium is in the range of from about 1:0.5 to about 1:1.5. By "aqueous emulsifying medium" is meant water containing an emulsifying amount of surface active agent, usually from about 0.2 to about 5 weight percent based on the medium of the surface active agent preferably from about 0.4 to about 1 weight percent. The amount of surface active agent employed is usually dependent on the volume ratio of polymer solution to aqueous medium, the viscosity of the polymer solution and the nature of the surface active agent. Surface active agents which are particularly useful for successful practice of this invention are anionic emulsifiers or mixtures thereof with non-ionic emulsifiers. Examples of suitable anionic emulsifiers include the water soluble soaps of soap-forming monocarboxylic acids, e.g. alkali metal salts of linoleic acid, of oleic acid, of stearic acid, of palmitic acid, of myristic acid, of lauric acid, of capric acid and the like. Also included are the sulfonated and sulfated compounds having the general formulae R—$SO_3$M and R—$OSO_3$M wherein R represents an organic radical having from 9 to 23 carbon atoms and M represents an alkali metal, an ammonium or like cationic group. Examples of the sulfonate and sulfate emulsifiers include dodecyl sodium sulfonate, sodium oleyl sulfate, ammonium dodecylbenzene sulfonate, potassium lauryl sulfate, disodium dodecylphenyl oxide disulfonate, dioctyl potassium sulfosuccinate, dihexyl sodium sulfosuccinate, and the aryl sulfonate-formaldehyde condensation products. Suitable non-ionic emulsifiers include the polyoxyethylene agents, e.g. ethylene glycol polyethers, ethylene nonylphenol polyethers, and the like; fatty acid esters of polyhydric alcohols, e.g. propylene glycol fatty acid ester and the like. Other suitable non-ionic emulsifiers are described in Becher, Emulsions: Theory and Practice, 2d ed., Reinhold Publishing Corporation, New York, 221–225 (1965).

Emulsification is effected by subjecting the combined polymer solution and aqueous medium to high shear agitation conditions commonly employed in emulsifying polymer solutions in aqueous media. Emulsification is successfully accomplished using a colloid mill, a homogenizer or similar high shear dispersing device. The foregoing is merely illustrative, as the particular method or means of emulsification is not critical and does not form an essential aspect of the present invention.

Following formation of the emulsion as described, the selective solvent and excess water is removed by conventional flashing techniques, if possible, or by creating and collapsing foam. The temperature at which the solvent is flashed off depends largely on the boiling point of the solvent-water azeotrope. If foaming is not a problem, a simple rotating evaporator can be successfully employed. Preferably, flashing of solvent and excess water is carried out at temperatures in the range of from about 40° to about 100° C. and under reduced pressures in the range of from about 0.1 to about 1 atmosphere. The amount of water removed depends on whether a dilute or concentrated latex is desired and on the ratio of water to polymer used in making the emulsion. Generally speaking, however, it is desirable to remove sufficient water such that the resulting latex is at least 35 weight percent solids to obtain a latex of useful concentration and not more than about 70 weight percent solids in order to avoid latex destabilization. In addition to evaporation, removal of excess water can also be accomplished by centrifuging the latex and withdrawing the layer of aqueous "serum" from the concentrated latex. The resulting concentrated latex, usually having from about 35 to about 70 weight percent polymer solids, is stable.

The unusual and unexpected characteristic of the latex is that the B-block forms the continuous phase in the latex particles even though the A—B block copolymer contains no less than 0.8 mole of A-block per mole of B-block and preferably as much as 2 moles of A-block to 1 mole of B-block. This unusual and unexpected characteristic is believed to contribute to the ability of the latex to form a continuous film over a broad temperature range.

Films of the concentrated latexes of this invention are readily formed by applying the latex, usually as a layer, to a substrate and drying to elastic, high modulus coatings.

The following examples are given to illustrate the invention and should not be construed as limiting its scope. All parts and percentages are by weight unless otherwise indicated.

Example 1

A 50-g. portion of a polystyrene-polybutadiene block copolymer containing 70 weight percent styrene and 30 weight percent butadiene and having an inherent viscosity of 1.4 (mol wt. of A block=$\sim 2.5 \times 10^5$ and mol wt. of B block=$\sim 1 \times 10^5$) is dissolved in 500 ml. of cyclohexane (solubility parameter=8.22), a selective solvent for the polybutadiene block. The resulting solution is emulsified in 300 ml. of water containing 2.5 g. of ammonium salt of sulfate ester of alkylphenoxypoly(ethyleneoxy)ethanol with an Eppenbach Homo-mixer (a turbine stirrer manufactured by Gifford-Wood Co., Hudson, N.Y., under U.S. Pat. 2,393,360) for a period of 10 minutes. The resulting emulsion is stripped of cyclohexane and concentrated to a total weight of 100 grams (~50 percent polymer solids) under reduced pressure using a rotating evaporator. A film of 20 mil wet thickness is cast onto a glass plate from this latex and is dried at room temperature to form a continuous, tough film which has thermal and oxidative resistance.

For the purposes of comparison, a control latex is prepared by dissolving 50 g. of the same block copolymer in 500 ml. of benzene, a solvent for both the polystyrene and polybutadiene blocks of the copolymer. The solution is emulsified in 300 ml. of water containing 2.5 g. of ammonium salt of sulfate ester of alkylphenoxypoly-(ethyleneoxy)ethanol using the foregoing emulsification technique. The resulting emulsion is stripped of benzene and concentrated to a total weight of 100 grams (~51.2 percent polymer solids) under reduced pressure using a rotating evaporator. A film of 20 mil wet thickness is cast onto a glass plate from this latex and allowed to dry at room temperature. The resutling film is severely cracked and non-continuous.

Example 2

A 50-g. portion of the polystyrene-polybutadiene block copolymer of Example 1 is dissolved in a mixed selective solvent of 225 g. of benzene and 225 g. of n-heptane (this mixed solvent has a solubility parameter of 8.2). This polymer solution is emulsified in 300 ml. of water containing 1.5 g. of sodium dodecylbenzene sulfonate and 0.5 g. of a nonylphenol-ethylene oxide condensate having 9–10 moles of ethylene oxide per mole of condensate by adding the polymer solution to the water and subjecting the resulting two layer system to high shear mixing for seven minutes using an Eppenbach Homo-mixer. The resulting emulsion is stripped of polymer solvent and concentrated to 102 g. (corresponding to 48.2 weight percent polymer solids) at room temperature under reduced pressure of ~50 m. Hg using a rotating evaporator. The resulting latex is cast as a film (20 mil wet thickness) onto a glass substrate and allowed to dry under ambient conditions. The dried film is similar to the film of Example 1.

Example 3

A 75-g. portion of the polystyrene-polybutadiene block copolymer of Example 1 is dissolved in 750 ml. of cyclohexane. This polymer solution is emulsified in 250 ml. of water containing 2 g. of potassium oleate by adding the water to the polymer solution under continuous high shear conditions using an Eppenbach Homo-mixer throughout the addition. Following the addition the combined polymer solution and water phases are subjected to an additional 10–15 minutes of high shear agitation during which time an additional 250 ml. of water is added to the combined phases.

The resulting emulsion is stripped of solvent, concentrated to 48.2 weight percent polymer solids and cast as a film by the manner described in Example 2. The resulting film is continuous at room temperature and exhibits properties similar to the film of Example 1.

Example 4

In accordance with Example 2 except that a total of 450 ml. of cyclohexane is used as selective solvent, a stable latex having 48.2 weight percent polymer solids is cast as a 5 ml. wet film on a polyethylene terephthalate sheet and is allowed to air dry on a metal block having a temperature gradient of 0° to 23° C. from one end to the other. The resulting dried film is transparent and continuous on all portions of the polyethylene terephthalate sheet indicating that the latex is film-forming over the temperature range of 0° to 23° C.

In a comparative run in accordance with the preceding run except that 450 ml. of benzene is used in place of cyclohexane as the polymer solvent, the resulting dried film is white and is not continuous on any portion of the polyethylene terephthalate sheet indicating that the latex is non-film forming over the temperature range of 0° to 23° C.

Examples 5–6

Following the procedure of Example 1, block copolymers of polystyrene/polybutadiene (60%/40%) and polystyrene/polybutadiene (80%/20%) are dissolved in cyclohexane and converted to latexes which are cast as films onto glass substrates and air dried at room temperature. The resulting dried films are continuous and have properties similar to those of the film of Example 1.

What is claimed is:

1. A process for providing a latex of a normally solid block copolymer having the general configuration A—B wherein each A is a polymer block of a monovinylidene carbocyclic aromatic compound and each B is a polymer of a conjugated diene, the molar ratio of A to B being in the range of from about 0.8:1 to about 2:1 and the B block constitutes the continuous phase of the particles of the latex; said process comprising the steps of (1) dissolving said block copolymer in an organic liquid which is a selective solvent for block B; (2) emulsifying the resulting solution in an amount of water sufficient to provide a weight ratio of polymer solution to water in the range from about 1:0.5 to about 1:1.5, and (3) removing organic liquid therefrom.

2. The process according to claim 1 wherein the average molecular weight of each block A is between about 30,000 and about 800,000 and the average molecular weight of each block B is between about 10,000 and about 400,000.

3. The process according to claim 2 wherein the weight percent copolymer solids is within the range from about 35 to about 70.

4. The process according to claim 3 wherein the monovinylidene aromatic compounds has from about 8 to about 12 carbon atoms and the conjugated diene has from 4 to 6 carbon atoms.

5. The process according to claim 4 wherein the monovinylidene aromatic compound is styrene and the conjugated diene is butadiene.

6. The process according to claim 1 wherein the selective solvent is selected from the group consisting of cyclic alkanes and mixtures of aromatic hydrocarbons and acyclic alkanes.

7. The process according to claim 1 wherein the selective solvent is selected from the group consisting of cyclopentane, cyclohexane, cycloheptane and mixtures of benzene, toluene, naphthalene, and xylene with n-pentane, n-hexane, n-heptane, n-octane and iso-octane.

8. The process according to claim 1 wherein the block copolymer comprises from about 60 to about 80 weight percent of A-block and from about 20 to about 40 weight percent of B-block.

References Cited
UNITED STATES PATENTS

| | | |
|---|---|---|
| 3,310,516 | 3/1967 | La Heij et al. ___ 260—29.7 EM |
| 3,439,064 | 4/1969 | Makowski et al. __ 260—880 B |
| 3,445,414 | 5/1969 | Glymph et al. __ 260—29.7 EM |

ALLAN LIEBERMAN, Primary Examiner

P. N. THOMAS, Jr., Assistant Examiner

U.S. Cl. X.R.

260—29.7 R, 880 B